May 26, 1964 LE MOYNE E. FARNSWORTH 3,134,894
MOTOR DRIVEN WELDING GUNS
Filed Sept. 27, 1957 3 Sheets-Sheet 1
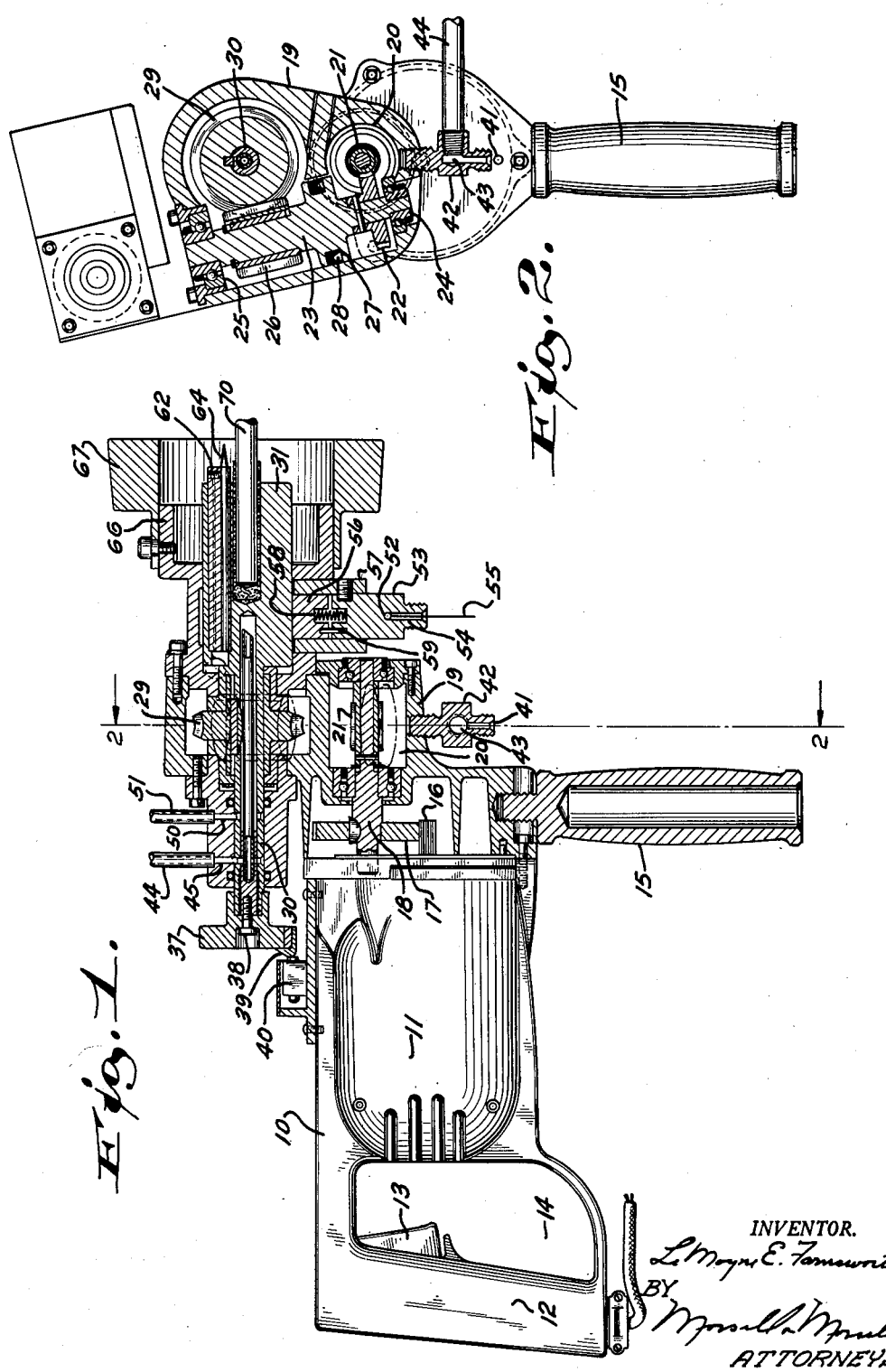
INVENTOR.
L. Moyne E. Farnsworth
BY
ATTORNEYS.

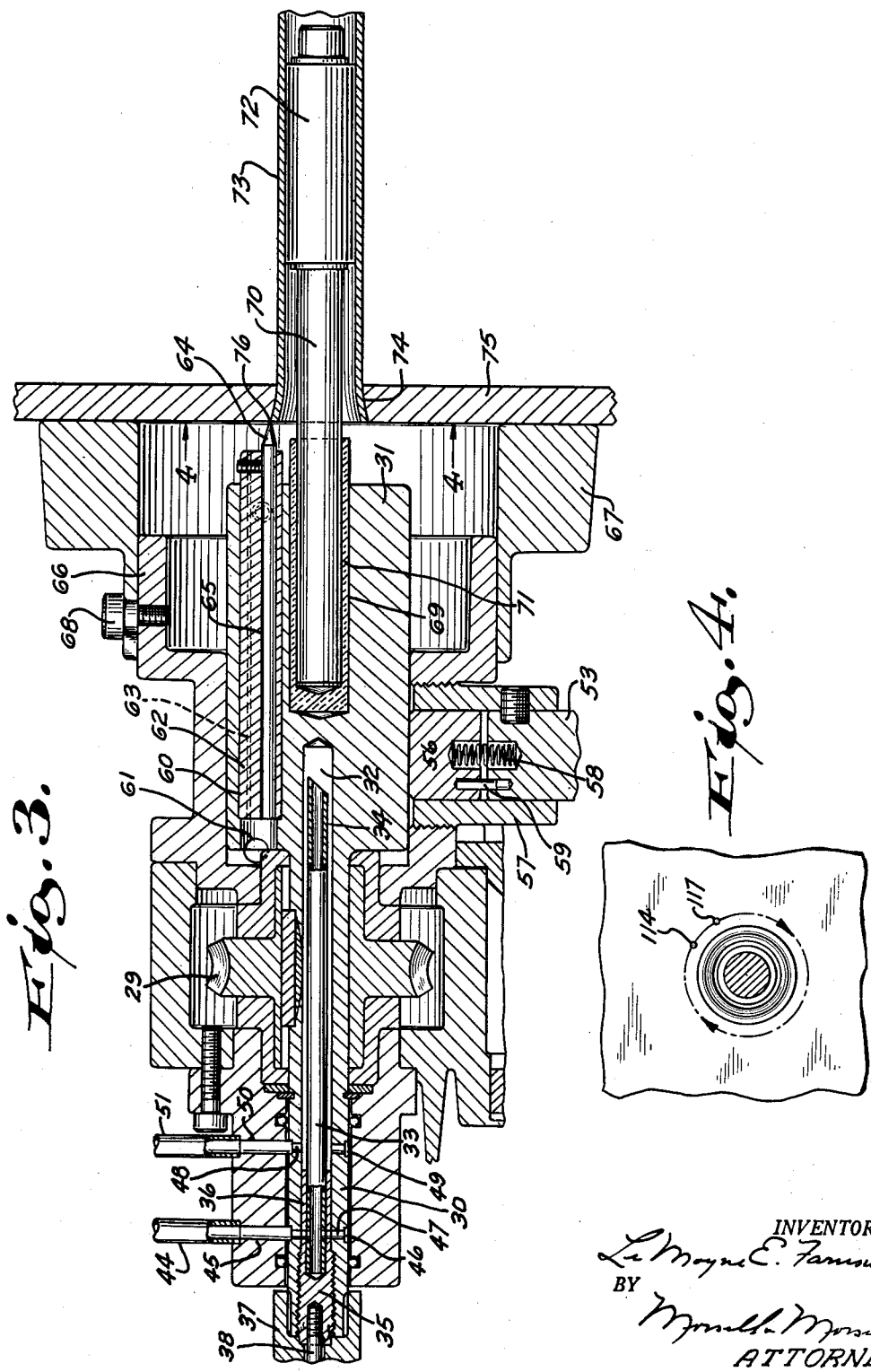

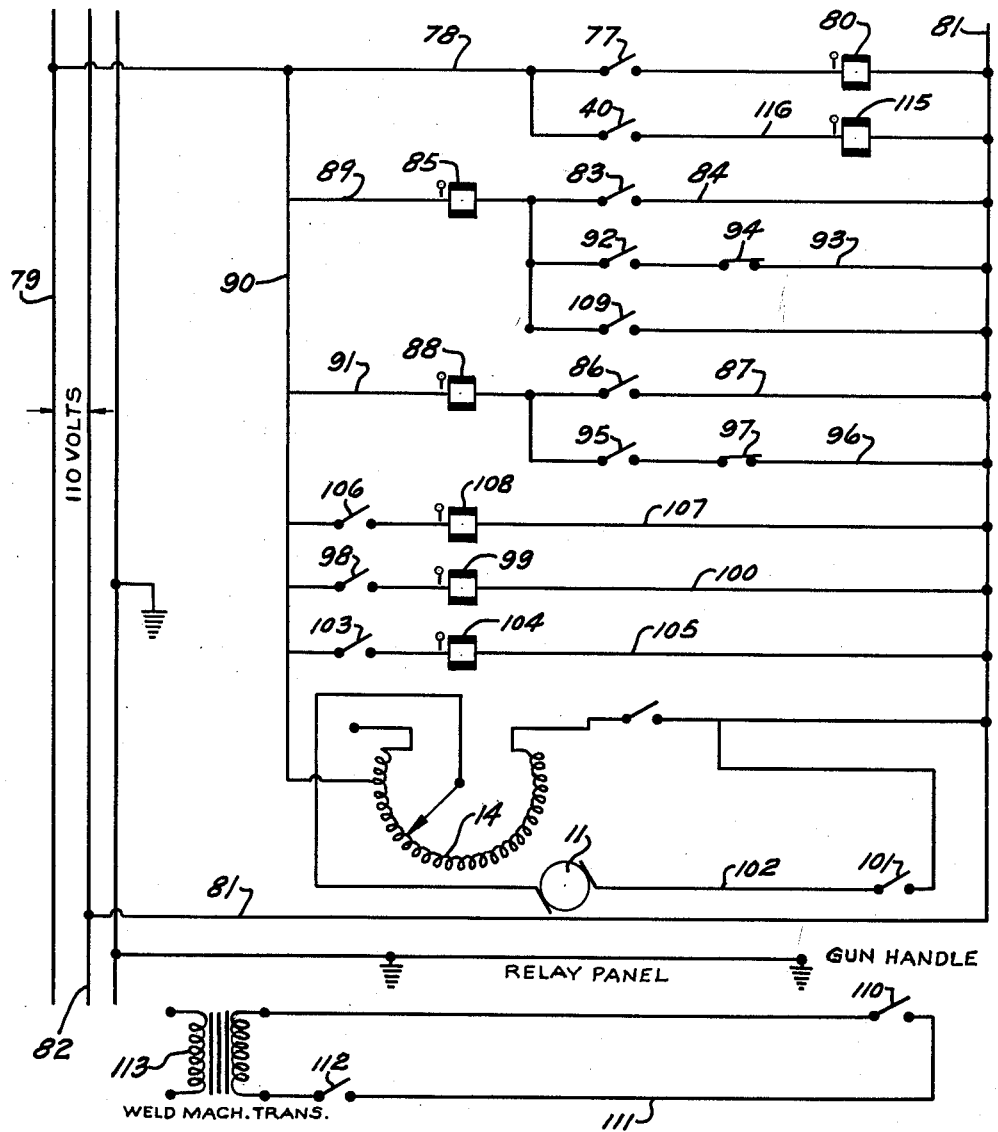

United States Patent Office 3,134,894
Patented May 26, 1964

3,134,894
MOTOR DRIVEN WELDING GUNS
Le Moyne E. Farnsworth, Racine, Wis., assignor to Automation Machines and Equipment Co., Inc., Milwaukee, Wis., a corporation of Wisconsin
Filed Sept. 27, 1957, Ser. No. 686,701
12 Claims. (Cl. 219—125)

This invention relates to improvements in motor driven welding guns.

Heretofore it has been common practice to weld tube ends within holes in plates by conventional hand methods. This is a tedious procedure where there is a multiplicity of tubes, and furthermore hand welding does not insure a uniform weld all the way around the tube end. It has heretofore been proposed to rotate an electrode around a piloting mandrel which is inserted in the tube end. In these prior devices, the welding tool has been turned by hand and there has been a loose hanging wire for conducting electricity to the welding electrode, which wire gets twisted and is in the way during use.

It is a general object of the present invention to provide an improved welding gun wherein there is motor driven means for rotating the tool around a pilot, and wherein there is a novel means for conducting electricity to the rotatable portion of the tool to eliminate the difficulties heretofore encountered.

A further object of the invention is to provide a motor driven welding gun as above described which maintains a constant arc length and speed to insure uniform welding all around the tube end.

A further object of the invention is to provide a welding gun having means for automatically delaying the drive for rotatable movement of the welding tool until after the welding arc has been established for a sufficient length of time to create a puddle, there also being means for causing overlap of the start and finish of the weld line, and for thereafter shutting off the welding current while allowing rotation to continue to return the electrode to a predetermined upper starting position.

A further object of the invention is to provide a welding gun having novel means for cooling whereby overheating of interior parts due to the heat from the welding arc is prevented.

A further object of the invention is to provide a welding gun as above described wherein there is an adjustable electrode holder so that the electrode can be positioned at varying distances from a center so as to be adaptable for welding around tube ends of varying diameters.

Other objects of the invention are to provide a welding gun which is neat in appearance, simple to operate, durable, and one which is capable of welding a multiplicity of tube ends in a minimum of time.

With the above and other objects in view, the invention consists of the improved welding gun, and all of its parts and combinations, as set forth in the claims, and all equivalents thereof.

In the accompanying drawings, illustrating one complete embodiment of the preferred form of the invention, in which the same reference numerals designate the same parts in all of the views:

FIG. 1 is a side elevational view of the improved welding gun, part being shown in vertical section.

FIG. 2 is a sectional view taken on line 2—2 of FIG. 1.

FIG. 3 is a fragmentary vertical sectional view showing the electrode holder and associated parts in operative position to perform a weld around a tube, showing the piloting mandrel inserted in a hole and tube end.

FIG. 4 is a sectional view taken on the line 4—4 of FIG. 3, the dot and dash line being a diagrammatic showing of the course travelled by the electrode.

FIG. 5 is a wiring diagram.

Referring more particularly to the drawings, the numeral 10 designates a suitable housing for an electric motor 11, said housing having a hand grip 12 equipped with a movable switch operating trigger 13. Forwardly of the hand grip 12 and projecting downwardly is a straight handle 15 which is adapted to be held by the left hand.

A pinion 16 driven by the motor drives a gear 17 keyed to a shaft 18. The latter is journalled through a housing portion 19 having a hollow lower chamber 20. Within said hollow chamber is a worm 21 which is keyed to the shaft 18. The worm in turn meshes with a worm wheel 22 rigidly mounted on the end of a shaft element 23 (see FIG. 2). The lower end of the shaft element 23 is journalled in a bearing set 24 and the upper end is journalled in a bearing set 25. Below the bearing 25 a worm 26 is keyed to the shaft element 23. Between the worm 26 and the worm wheel 22 is an annular enlargement 27 on the shaft element 23 which enlargement carries an annular seal 28.

The worm 26 meshes with a worm wheel 29 keyed to a tubular shaft 30. This wheel is made of suitable electric insulating material such as a plastic. A product marketed under the name of "Teflon" is satisfactory. As is shown in FIG. 3, the tubular shaft 30 is an extension of an electrode driving cylinder 31, preferably formed of aluminum, and the bore 32 of the tubular shaft 30 extends into the driving cylinder 31 as shown. Extending concentrically within said bore 32 is a water cooling tube 33 which has an outside diameter sufficiently less than the inside diameter of bore 32 to provide a cylindrical cooling jacket 34 through which the water may circulate.

A plug 35 is threaded into an enlarged tapped end of the bore 32 as shown in FIG. 3 and the plug has a cylindrical extension 36 which fits between the water tube 33 and the wall of the bore 32 to snugly fill the annular space 34 and close the end of the bore 32 as well as the corresponding end of the tube 33. The outer portion of plug 35 and tubular shaft 30 project from the housing, and a timing wheel 37 is rigidly secured thereto by screw 38. The timing wheel has a cam portion 39 which, when in proper position as shown in FIG. 1, is engageable with an electric switch 40 to actuate the latter.

Cooling water from any suitable source is fed into the opening 41 of a fitting 42. A chamber 43 of the fitting is connected by a line 44 with a water inlet 45 at the top of the gun. Referring again to FIG. 3, the inlet conduit 44 leads through a duct 45 to an annular groove 46 in the exterior of the tubular shaft 30, which annular groove is connected by ducts 47 with the interior of the water tube 33. This water flows the length of the tube and emerges from its inner end into the inner end of the bore 32. The water then circulates back through the annular jacket 34, out of ducts 48 leading to an annular groove 49, into an outlet port 50 which registers with the annular groove 49. The outlet port 50 is connected by a suitable hose 51 with a duct 52 in a brass fitting 53 (see FIG. 1). A water outlet 54 carries the water to a suitable drain. A welding cable 55 extends from the transformer 113 into the water outlet duct 54 and concentrically therein to connect with the brass fitting 42. The arrangement is such that the water keeps the cable cool.

A brush 56, having its inner end in contact with the rotatable electrode driver 31 to conduct electricity thereto, is yieldingly mounted in a brush holder tube 57 on a spring 58. The brush is connected by one or more flexible wires 59 with the brass fitting 52 so that electricity is carried to the brush.

Referring again to FIG. 3, the electrode driver 31 has a longitudinal bore 60 into which gas is admitted through a port 61. An electrical conducting electrode holding tube 62, preferably formed of brass, fits snugly and rotatably into bore 60 of the electrode holder 31. The tube has a longitudinal duct 63 for conducting gas which enters the port 61 to the outer end of the holder 62 adjacent the tip of the tungsten electrode 64. The electrode 64 is slidably received in an eccentric bore 65 in the electrode holder 62. The electrode holder may be rotatably adjusted and held in position by any suitable means such as a set screw to maintain the point of the electrode at a selected distance from the center of the electrode driving cylinder 31. In FIG. 3, a suitable set screw is shown by dotted lines. When the set screw is loosened, the holder 62 may be rotated to change the distance of the electrode 64 from the center of rotation so that it may be adjusted to tubes of varying diameter.

Near the outer end of the electrode driving cylinder 31 is a cup-shaped housing portion 66 to which a circular shield 67, which projects outwardly to surround the welding zone, is removably and axially adjustably attached by one or more screws 68.

The outer end of the electrode driving cylinder 31 has a concentric bore 69 within which the inner end of a mandrel 70 is held, there being electric insulation 71 between the mandrel and electrode holding cylinder 31. The mandrel projects outwardly a substantial distance and carries a piloting cylinder 72 of a diameter to fit snugly within a tube 73 whose end is to be welded within an opening 74 of a metal plate 75, as shown in FIG. 3. The mandrel and its roller thereby serve to maintain the tool centered with respect to the work so that when the electrode driver 31 is rotated through the train of gears heretofore described, the tip of the electrode 64, after being properly adjusted to the size of the tube, will travel a true circle with respect to the axis of the tube 73 to make a circular weld on the circular line 76 where the exterior of the flared tube end contacts the margin of the hole 74 in plate 75. During operation the mandrel 70 rotates within the piloting cylinder 72.

*Operation*

During operation, reference being made to the wiring diagram and relay circuit shown in FIG. 5, when the trigger 13 of the gun is depressed, it serves to close a switch 77 in a line 78 leading from a main line 79. This completes the circuit to magnet of a relay 80, the other side of the relay magnet being connected to a wire 81 leading to one of the other main line wires 82. When the relay 80 is energized, it closes switch 83 in a line 84 which leads from the line 81 to one side of the magnet of a relay 85. Energizing of the relay 80 also closes switch 86 in a line 87 leading from the line 81 to one side of the magnet of a relay 88. Closing of switch 83 causes energization of relay 85 which is connected by wire 89 with line 90. Closing of switch 86 then causes energization of relay 88 which is connected by line 91 with a line 90. When relay 85 is energized, it also causes closing of a switch 92 to a holding circuit line 93 having a normally closed switch 94 therein. This holding circuit then continues to energize the magnet of relay 85 even after the trigger 13 of the gun is released.

When relay 88 is energized, it also closes switch 95 in a holding circuit 96 having a normally closed switch 97 therein, whereby relay 88 is thereafter kept energized by the holding circuit 96 even after the trigger 13 of the gun is released.

When relay 85 is energized, it closes a switch 98 leading to one side of a relay 99 in a line 100 to energize the latter. Relay 99, after a predetermined time delay, closes time delay switch 101 in a line 102.

When relay 88 is energized, it also closes switch 103 to energize the magnet of relay 104 in line 105. The latter in turn closes the switch 106 in line 107 to energize the magnet of relay 108. When the latter is energized, it closes switch 109 and also a switch 110 in the circuit 111 leading to the contactor 112 of the welding gun power transformer 113. Thus, when the contactor 112 is closed, it energizes the electrode 64 of the gun, thereby producing the arc.

In the meantime, the gun has been positioned as shown in FIG. 3 against an upright plate 75 having a hole 74 within which the flared end of the tube 73 has been inserted to be welded in position in the hole. Previously, the adjustable electrode holder 62 has been adjusted and set to bring the tip of the electrode a proper distance from the center to contact the circle 76 for the weld.

The arrangement is such, as will be hereinafter referred to, that when the gun is held in operative position before the drive motor 11 is started, the electrode will be at the 1 o'clock position 114 shown in FIG. 4 by the dot-and-dash line. It is to be understood that the dot-and-dash line circle in FIG. 4 is outwardly of its actual position. The dot-and-dash line being for the purpose of diagrammatically illustrating the circular course of travel of the electrode. The time delay after starting of the arc, which is produced by the time delay switch 101, allows the material to puddle in the position 114 of FIG. 4 until there is a desired quantity of molten material before the electrode starts its rircular course of travel. After a predetermined time delay, approximately ¼ to ½ second, the motor 11 starts. The motor circuit includes a variable transformer 14.

Operation of the motor acts through the pinion 16, gear 17, worm 21, worm wheel 22, worm 26, and worm wheel 29 to rotate the aluminum electrode driver 31 so as to cause the electrode to travel in a clockwise direction as indicated by the arrows in FIG. 4. This rotation continues until the cam 39 on timing wheel 37, the latter rotating with the electrode driver 31, trips the microswitch 40, momentarily energizing the relay 115 in line 116. This momentarily opens the normally closed switches 94 and 97. When switch 97 is opened the holding circuit on relay 88 is broken, thereby deenergizing relay 88. When relay 88 is deenergized a switch 103 is opened, thereby deenergizing relay coil 104. When relay 104 is deenergized the time delay switch 101 opens after a predetermined delay. This last delay allows the electrode to travel beyond the 1 o'clock position 114 of FIG. 4 to a 2 o'clock position 117 to overlap its starting position. When the time delay switch 101 finally opens, relay 108 is deenergized, thereby opening switch 110 to deenergize the weld-power transformer contactor 112 and extinguish the arc.

Although normally closed contact 94 is momentarily opened, relay coil of relay 85 remains energized through the previously closed switch 109. As the timing cam 39 of FIG. 1 leaves the switch 40, thereby deenergizing the coil of relay 115, contact 94 again returns to its normally closed position, thereby keeping the coil of relay 85 energized after switch 109 has been opened following the time delay initiated in switch 106. This arrangement is provided in order to keep the motor 11 operating after the arc is extinguished so as to allow the electrode to return to the 1 o'clock starting position 114 of FIG. 4 to be in proper starting position for another welding operation.

After this second rotation of the electrode holder 31 the timing cam 39 again trips switch 40 closing the switch 40 and energizing the coil of relay 115. When this occurs switch 94 is opened, causing the coil of relay 85 to become deenergized. As this takes place switch 98 is opened and the coil of relay 99 becomes deenergized. As the latter deenergization occurs, the delay switch 101 is opened, thereby opening the circuit to the motor 11 and causing rotation to stop at the 1 o'clock position 114 of FIG. 4.

It is to be noted from FIG. 3 that during operation the piloting cylinder 72 is snug within the tube 73 with the mandrel 70 rotating inside of the cylinder 72 while being held in a perfectly concentric position with respect to the tube 73 being welded. As a result the weld line is always perfectly positioned.

Due to the time delay at the start of a welding operation, which permits the building up of a puddle, there is no chance of the electrode starting travel without performing a suitable weld. Furthermore, the overlap of the finishing position 117 as shown in FIG. 4 also insures a proper weld in the region of the starting and stopping position.

By having the control which insures final stopping of the electrode in the 1 o'clock position 114 of FIG. 4, there is no danger of a new weld being started at a bottom position in the circle. If the welding starts at the bottom and then proceeds upwardly, the hardest part of the work is done before the material has been sufficiently affected by the heat. The present invention avoids the possibility of starting in an undesirable position and insures perfect welds all around the circle.

During operation the water which circulates in the bore 32 keeps all of the parts, including the aluminum electrode holder 31, cool and continuously conveys heat away from the operating parts. In addition, the water which is passing out to the drain keeps the electric wire 55 which leads to the electrode driver brush cool. It is to be understood that wire 55 extends from one side of the welding machine transformer 113, with the other side being grounded, and the work being grounded.

By having the motor 11 driven at a constant speed, a uniform movement is maintained which also insures a uniformity of weld.

It is to be understood that the present invention is not to be limited to the exact details of construction shown and described, for obvious modifications will occur to persons skilled in the art.

What I claim is:

1. In a welding device, a frame adapted to be removably positioned adjacent the work, an electrode driver having opposite ends rotatably supported in said frame with one end projecting, an electrode, means in said electrode driver for mounting the electrode in said projecting end in a position which is eccentric with respect to the axis of rotation of the electrode driver, a shaft journaled in the frame and projecting from the other end of the electrode driver, a gear on said shaft, a motor in said frame, means for transmitting motion from said motor to said gear to rotate the shaft and electrode driver, said shaft having a cooling liquid duct therein which extends into said electrode driver, and means for admitting liquid to and discharging it from said duct while the shaft and electrode driver are rotating.

2. In a welding device, a frame adapted to be removably positioned adjacent the work, a cylindrical electrode driver rotatably supported in said frame with one end projecting, an electrode, means in said electrode driver for mounting the electrode in said projecting end in a position which is eccentric with respect to the axis of rotation of the electrode driver, a shaft journaled in the frame and projecting from the other end of the electrode driver, a gear rigid on said shaft, said frame having a gun-like portion with a trigger, a motor in said portion, means between said motor and gear for causing rotation of said electrode driver, and means including a switch actuated by said trigger for controlling said motor.

3. In a welding device, a frame adapted to be removably positioned adjacent the work, a cylindrical electrode driver rotatably supported in said frame, said driver having a bore which is eccentric with respect to its axis of rotation and having a gas inlet, a cylindrical electrode holder within said bore having an outer end and having a gas duct which extends longitudinally of the electrode holder, said holder having an eccentric longitudinal bore for removably receiving an electrode, and means for securing the electrode holder in a selected position of rotatable adjustment within the bore of the electrode driver to hold the electrode a predetermined distance radially outwardly from the axis of rotation of the electrode driver, there being means providing constant communication between said gas inlet and gas duct of the electrode holder whereby gas may pass through said gas duct of the holder to the exterior.

4. In a welding device, a frame adapted to be removably positioned adjacent the work, an electrode driver rotatably supported in said frame, an electrode, means in said electrode driver for holding the electrode in an operative position which is eccentric with respect to the axis of rotation of the electrode driver, an electric motor in said frame, means for transmitting motion from said electric motor to said electrode driver, an electric circuit for said motor, means including an electric circuit for energizing said electrode to create a welding arc, a timing member rotatable with said electrode driver and having a cam, and means including a switch in said electric circuits positioned to be operated by said cam for controlling the electric motor and the welding arc.

5. In a welding device, a frame adapted to be removably positioned adjacent the work, an electrode driver rotatably supported in said frame, a timing member rotatable with said electrode driver, an electrode, means in said electrode driver for holding the electrode in an operative position which is eccentric with respect to the axis of rotation of the electrode driver, an electric motor in said frame, mean for transmitting motion from said electric motor to said electrode driver, an electric circuit for said motor, means including an electric circuit for energizing said electrode to create an arc, manual means for starting said arc, means in said electric circuits for thereafter starting said motor, means in said electric circuits controlled by said timing member for stopping said arc after a predetermined amount of rotation of the electrode driver, and means in said electric circuits controlled by said timing member for stopping said motor after the electrode has been returned to starting position.

6. In a welding device, a frame adapted to be removably positioned adjacent the work, an electrode driver rotatably supported in said frame, a timing member rotatable with said electrode driver, an electrode, means in said electrode driver for holding the electrode in an operative position which is eccentric with respect to the axis of rotation of the electrode driver, an electric motor in said frame, means for transmitting motion from said electric motor to said electrode driver, an electric circuit for said motor, means including an electric circuit for energizing said electrode to create an arc, manual means for starting said arc, means in said electric circuits for thereafter starting said motor, means in said electric circuits controlled by said timing member for stopping said arc after the electrode driver has been rotated in excess of 360°, and means in said electric circuits controlled by said timing member for stopping said motor after the electrode has been returned to starting position.

7. In a welding device, a frame adapted to be removably positioned adjacent the work, a cylindrical electrode driver of electrical conducting material rotatably supported in said frame, a brush yieldingly carried by said frame in a position of engagement with the periphery of said electrode driver, an electrode, means in said electrode driver for holding said electrode in operative electrical conducting position in said electrode driver, which position is eccentric with respect to the axis of rotation of the electrode driver, and means including said brush for transmitting electrical energy to said electrode driver and electrode in any position of rotation of the electrode driver.

8. In a welding device, a frame adapted to be removably positioned adjacent the work and having cooling liquid ducts, a cylindrical electrode driver of electrical conducting material rotatably supported in said frame, a brush yieldingly carried by said frame in a position of engagement with the periphery of said electrode driver, an electrode, means in said electrode driver for holding said electrode in operative electrical conducting position in said electrode driver, which position is eccentric with respect to the axis of rotation of the electrode driver, and means including said brush for transmitting electrical energy to said electrode driver and electrode in any position of rotation of the electrode driver, said last means including a cable leading to said brush through one of said cooling liquid ducts.

9. In combination; a housing, an electrically conductive member rotatably mounted in said housing, means for rotating said member, electrode holder means mounted on and rotatable with said member, a welding electrode having a tip mounted on said holder means, adjustable means for varying the distance between the axis of rotation of said member and said electrode tip, means for supplying arc shielding gas to said electrode tip, means to cool said member at leas adjacent the mounting of the holder means thereon, stop means mounted on said housing having a work engaging surface, and means for adjusting the relative locations of said work engaging surface and said electrode tip.

10. In a welding device, a frame adapted to be removably positioned adjacent the work, a cylindrical electrode driver rotatably supported in said frame, said driver having a bore which is eccentric with respect to its axis of rotation and having a gas inlet, a cylindrical electrode holder within said bore having an outer end and having a gas duct which extends longitudinally of the electrode holder, said holder having a longitudinal bore for removably receiving an electrode, and there being means providing constant communication between said gas inlet and gas duct of the electrode holder whereby gas may pass through said gas duct of the electrode holder to the exterior.

11. In a welding device, a frame adapted to be removably positioned adjacent the work, a cylindrical electrode driver rotatably supported in said frame with one end projecting, an electrode, means in said electrode driver for mounting the electrode in said projecting end in a position which is eccentric with respect to the axis of rotation of the electrode driver, a shaft journaled in the frame and projecting from the other end of the electrode driver, said frame having a gun-like portion with a trigger, a motor in said portion, means between said motor and shaft for causing rotation of said electrode driver, and means including a switch actuated by said trigger for controlling said motor.

12. In combination; a housing, an electrically conductive member rotatably mounted in said housing, means for rotating said member, electrode holder means mounted on and rotatable with said member, a welding electrode having a tip mounted on said holder means, means for supplying arc shielding gas to said electrode tip, means to cool said member at least adjacent the mounting of the holder means thereon, stop means mounted on said housing having a work engaging surface, and means for adjusting the relative locations of said work engaging surface and said electrode tip.

References Cited in the file of this patent
UNITED STATES PATENTS

| | | |
|---|---|---|
| 1,949,251 | Gilbert | Feb. 27, 1934 |
| 2,721,248 | Kirkpatrick | Oct. 18, 1955 |
| 2,795,689 | McNutt | June 11, 1957 |